(12) United States Patent
Satko et al.

(10) Patent No.: US 12,461,404 B2
(45) Date of Patent: Nov. 4, 2025

(54) ANALYZING MICROTEXTURED REGIONS OF OPTICALLY ANISOTROPIC MATERIALS

(71) Applicant: MRL Materials Resources LLC, Beavercreek, OH (US)

(72) Inventors: Daniel P. Satko, Centerville, OH (US); Ayman A. Salem, Beavercreek, OH (US); Thomas J. Carmody, Chicago, IL (US); Patrick M. Fleisher, Kettering, OH (US)

(73) Assignee: MRL Materials Resources LLC, Beavercreek, OH (US)

( * ) Notice: Subject to any disclaimer, the term of this patent is extended or adjusted under 35 U.S.C. 154(b) by 266 days.

(21) Appl. No.: 18/452,881

(22) Filed: Aug. 21, 2023

(65) Prior Publication Data

US 2023/0400720 A1 Dec. 14, 2023

Related U.S. Application Data

(63) Continuation-in-part of application No. 18/178,630, filed on Mar. 6, 2023, which is a continuation of application No. 16/431,161, filed on Jun. 4, 2019, now Pat. No. 11,598,981.

(60) Provisional application No. 62/680,093, filed on Jun. 4, 2018.

(51) Int. Cl.
G02F 1/11 (2006.01)
G01N 21/21 (2006.01)

(52) U.S. Cl.
CPC ............ G02F 1/116 (2013.01); G01N 21/21 (2013.01)

(58) Field of Classification Search
CPC .. G01N 21/21; G01N 21/956; G01N 23/2251; G01N 21/47; G01N 21/9501; G01N 2021/4792; G01N 21/274; G01N 21/211; G01N 2021/8466; G01N 21/3554; G01N 21/359; G01N 21/636; G01N 21/94; G01N 2201/129; G01N 2223/1016; G01N 2223/612; G01N 23/046; G01N 33/0098; G01N 2021/218; G01N 2021/646; G01N 21/63; G01N 21/6445; G01N 21/6489; G01N 21/66; G01N 21/71; G01N 21/95; G01N 2201/0484; G01N 2201/06113; G01N 2201/0683; G01N 2201/102; G01N 2201/12; G01N 2021/0112; G01N 2021/213; G01N 2021/8477; G01N 21/01; G01N 21/59; G01N 21/95607; G01B 11/0616; G01B 11/24
USPC ........................................................ 356/305
See application file for complete search history.

(56) References Cited

U.S. PATENT DOCUMENTS

| | | | | |
|---|---|---|---|---|
| 5,835,220 A | * | 11/1998 | Kazama | G01J 4/04 |
| | | | | 356/369 |
| 2008/0062851 A1 | * | 3/2008 | Hayashi | G11B 7/1374 |
| 2010/0245819 A1 | * | 9/2010 | Li | G01B 11/0641 |
| | | | | 356/369 |
| 2011/0235038 A1 | * | 9/2011 | Fukazawa | G01N 21/95607 |
| | | | | 356/369 |
| 2018/0095166 A1 | * | 4/2018 | Inoue | G01B 21/22 |

(Continued)

*Primary Examiner* — Sunghee Y Gray
(74) *Attorney, Agent, or Firm* — Thomas E. Lees, LLC

(57) ABSTRACT

Images of samples that are illuminated with polarized light are captured. Azimuth and inclination data are extracted from the captured images. The azimuth and inclination data are used to quantify MTRs.

10 Claims, 7 Drawing Sheets

(56) References Cited

U.S. PATENT DOCUMENTS

2019/0266399 A1* 8/2019 Kanamori ............ G06V 40/197

* cited by examiner

ANALYZING MICROTEXTURED REGIONS OF OPTICALLY ANISOTROPIC MATERIALS

CROSS REFERENCE TO RELATED APPLICATIONS

This application is a continuation-in-part of U.S. patent application Ser. No. 18/178,630, filed on Mar. 6, 2023, which claims the benefit of U.S. patent application Ser. No. 16/431,161, filed on Jun. 4, 2019, now issued as U.S. Pat. No. 11,598,981 on Mar. 7, 2023, which claims the benefit of U.S. Provisional Patent Application Ser. No. 62/680,093, filed Jun. 4, 2018, entitled "ANALYZING MICROTEXTURED REGIONS OF OPTICALLY ANISOTROPIC MATERIALS", the disclosure of which is hereby incorporated by reference.

STATEMENT REGARDING FEDERALLY SPONSORED RESEARCH OR DEVELOPMENT

This invention was made with government support under FA8650-17-P-5039 awarded by Air Force Research Laboratory. The government has certain rights in the invention.

BACKGROUND

The present disclosure relates generally to analyzing materials and, more particularly, to systems and methods for analyzing microtextured regions.

Materials science deals with the fundamental properties and characteristics of materials. For instance, the field of materials science often attempts to explore the relationship between the structure of materials at atomic or molecular scales (i.e., microstructure), as well as the macroscopic properties of such materials. By studying how different processes affect materials, and by studying how such materials perform under different conditions, an understanding of the limitations and capabilities of materials can be identified and predicted. Thus, there are ongoing efforts to characterize materials in various ways.

SUMMARY

The present disclosure provides systems and methods for analyzing microtextured regions (MTRs) in samples of optically anisotropic materials. Briefly described, in architecture, the disclosed embodiments capture images of samples that are illuminated with various polarization states of light and extract orientation data of the optic axis from the captured images. The optic axis orientation data are used to quantify MTRs.

According to aspects of the present disclosure, a system for performing microtexture analysis comprises a light source for emitting light. Further, a polarization state generator (e.g., linear polarizer) having a first polarization axis receives the emitted light from the light source and produces a polarized light from the received light. A beam splitter receives the polarized light and redirects the received light to an objective lens that focuses the redirected light onto a sample that has an optical anisotropy. Moreover, the objective lens receives a reflected light (which polarization state is changed as a function of the optical anisotropy) from the sample and propagates the reflected light back to the beam splitter. Further, the system includes a polarization state analyzer that has a second polarization axis that is orthogonal or nearly orthogonal to the first polarization axis, and the analyzer receives the propagated reflected light from the beam splitter and produces a partially extinguished light, which is a function of the first polarization axis, the second polarization axis, and the optical anisotropy of the sample. Further, the system includes a rotatable sample positioning device capable of producing rotation of the sample relative to the polarization state generator and polarization state analyzer. Moreover, the system includes a camera to capture an image of the partially extinguished light at several rotation angles and a processing system to quantify data from the captured set of images by flat-field correcting the captured images, performing image rotation and image registration, extracting an amplitude and a phase value for the captured image intensity variation at each corresponding pixel of the captured image set, correlating the amplitude with an inclination of the optic axis, correlating the phase with an azimuth of the optic axis, and quantifying microtextured regions (MTRs) using the inclination and azimuth by relating the optic axis to crystallographic orientation.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Various characteristics of materials affect their strength and susceptibility to failure. For example, microtextured regions (MTRs) in titanium (Ti) contribute to catastrophic failures under cold dwell fatigue loading conditions. These MTRs in Ti comprise clustered alpha grains (a-Ti) with a certain crystallographic orientation that results from thermomechanical processing of Ti alloys. Because MTRs in Ti compromise a structural integrity of the materials, it is important to properly quantify the MTRs.

Conventional approaches to quantifying MTRs include electron backscatter diffraction (EBSD) and spatially resolved acoustic spectroscopy (SRAS). Although EBSD accurately quantifies crystallographic orientation as an input for identifying MTRs, EBSD scans are both expensive and time-consuming. Thus, EBSD scanning for MTRs becomes both cost-prohibitive and time-inefficient for quantifying large areas and/or numbers of samples. Although SRAS is less expensive than EBSD for quantifying MTRs, SRAS suffers from a lower resolution and limited orientation information, which results in less accuracy than EBSD.

To ameliorate the problems related to cost, speed, and accuracy, the present disclosure provides systems and methods for analyzing MTRs using polarimetric imaging to extract azimuth and inclination data of the optic axis at various locations in a sample. Making use of the correlation between optic axis and basal pole (i.e. (0001) pole) in metallic materials having hexagonal crystal symmetry, this data can be associated with MTRs and, thus, provide an ability to quantify the MTRs accurately, quickly, and cost-effectively. Broadly, the present disclosure teaches capturing of images of samples that are illuminated with monochromatic polarized light. Both azimuth and inclination data of the optic axis (which can be converted to Euler angles for future analysis) are extracted from the captured images. The azimuth and inclination data are used to quantify MTRs.

Figure 1:
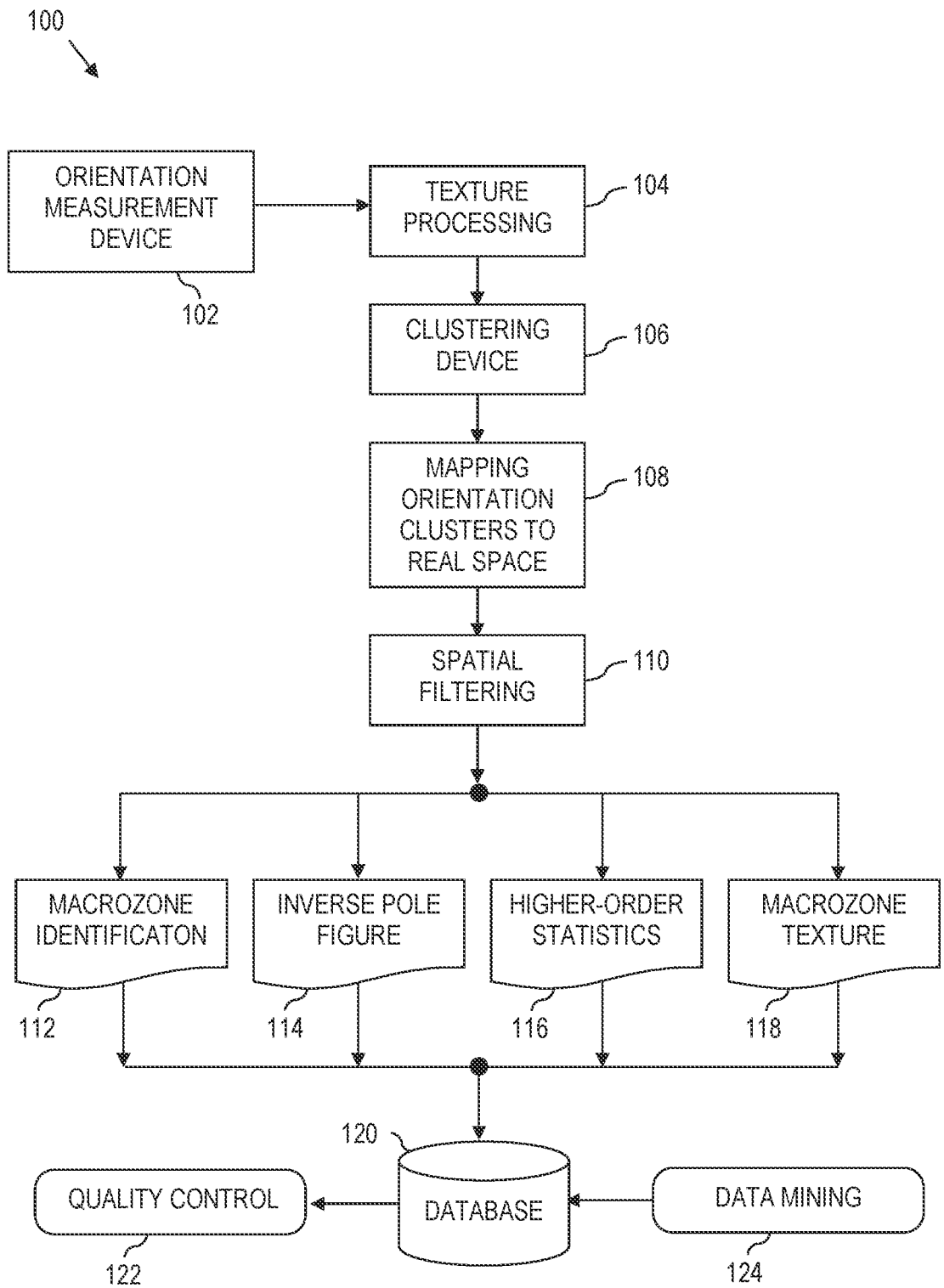
FIG. 1 is a flow diagram showing one embodiment of a system for analyzing microtextured regions (MTRs) of a sample, according to various aspects of the present disclosure.
Figure 2:
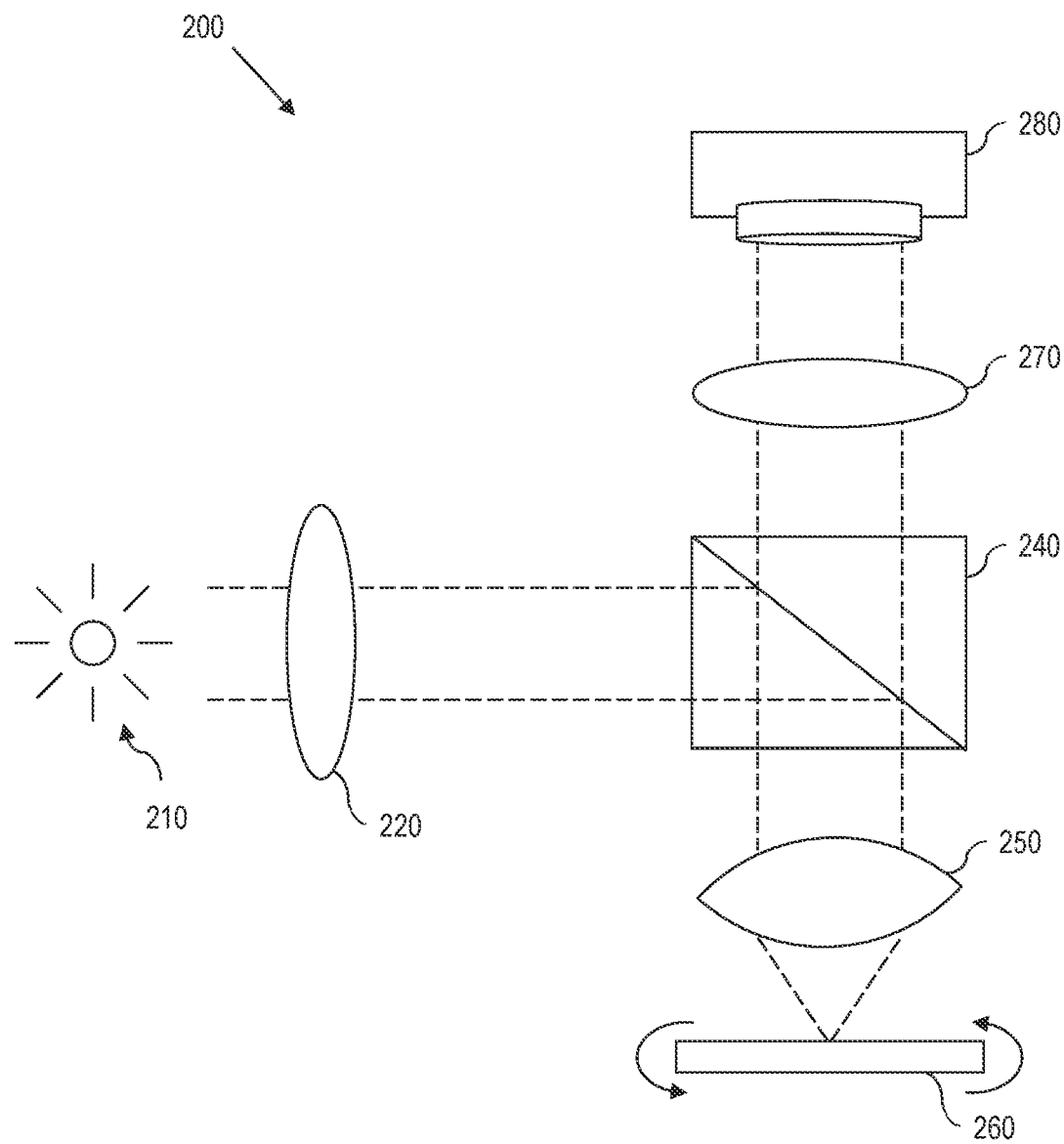
FIG. 2 is a block diagram of embodiments of an optical orientation measurement device for use in the system for analyzing MTRs of a sample, according to various aspects of the present disclosure.

Having provided a broad technical solution to a technical problem, reference is now made in detail to the description of the embodiments as illustrated in the drawings. Specifically, FIG. 1 shows one embodiment of a block diagram of a system for quantifying MTRs, while FIGS. 2 and 3 show embodiments of processes for quantifying MTRs. Although several embodiments are described in connection with these drawings, there is no intent to limit the disclosure to the embodiment or embodiments disclosed herein. On the contrary, the intent is to cover all alternatives, modifications, and equivalents. In addition to FIGS. 1 through 3, specific embodiments of different components and process steps are also described in greater detail, below.

Overall Flow Diagram

Referring now to the drawings, and particularly to FIG. 1, a flow diagram 100 illustrates a process for analyzing (e.g., identifying, quantifying, etc.) microtextured regions in materials with an ordered crystal structure, according to aspects of the present disclosure.

The process obtains crystallographic orientation information from a sample of a material under evaluation at 102. The orientation information may be derived from an existing data set, or the orientation information can be extracted from the sample under evaluation using an orientation measurement device. Several embodiments of the orientation measurement device are discussed below.

The orientation information obtained from the material sample is characterized in either sub-regions (i.e., "tiles") of a large area, or a large area is characterized and then split into tiles (i.e., sub-regions of the large area). Regardless, the orientation information is arranged into tiles that correspond to associated spatial locations of the sample. The tiles may contain information of one or more arbitrary dimensions (i.e. n-dimensions where n is any integer greater than 0). However, at least one of those dimensions should contain data about a location specific crystallographic orientation state (e.g. Euler angles, Rodrigues vector, Orientation matrix, etc.). The collection of information about the orientation state at multiple locations is then regarded as the texture.

Texture processing is performed at 104. In this regard, the tile processing discussed above may be implemented as a separate process (such as may be implemented before texture processing) or the above-tile processing may be implemented as part of the texture processing at 104.

As noted above, each measurement (in whatever form is provided by the particular orientation measurement technology) is mapped to a corresponding orientation matrix. Thus, there is an orientation matrix for each pixel of each tile. For every tile, the Generalized Spherical Harmonic (GSH) expansion is computed from the corresponding orientation matrices, which transforms the measurements to an "orientation space". For instance, in an illustrative implementation, data from each tile is processed such that "texture information" along with non-texture information (e.g., information about the quality and pedigree of the corresponding data, etc.), form a hybrid descriptor that is able to discern, for instance, the relevance of a given data point in relation to belonging to a calculated zone of microtexture.

The hybrid descriptors are inputted into a clustering device at 106. The clustering device outputs dominant zones of microtexture (also referred to herein as orientation clusters). In an illustrative implementation, a k-means clustering algorithm is used to find the most likely representative hybrid orientation descriptor such that the inner-class mean to the class centroids are minimized. However, in general, any methodology, algorithm, or combination of methodologies which provides a mapping from orientation descriptor to class label could be used in the place of the k-means clustering, which is discussed only as an example.

The orientation clusters are mapped to real space at 108. In an exemplary implementation, the dominant zones of microtexture output by the clustering device at 106 are spatially resolved at 108, back on to the original, corresponding spatial location in the sample. The orientation clusters are mapped back to the tiles and back to the original coordinate system from which they were collected.

Spatial filtering is performed at 110. Keeping with the above-exemplary implementation, local, spatial filtering is performed such that continuous regions of similar zones of microtexture are identified. Zones of microtexture are characterized by a representative orientation descriptor or collection of descriptors. In an illustrative implementation, data points that either do not belong to a coherent zone of microtexture or are of low quality are then labeled as outliers. In this instance a local voting scheme can be used to decide which zone of microtexture a given location belonged to in the case that there are multiple adjacent zones of microtexture.

A macrozone identification process can be performed at 112 to identify macrozones in the orientation descriptors. Moreover, a graphical presentation of orientation information of multiple datasets is implemented by plotting a continuous color-coded map (i.e., c-map (i.e., a c-axis orientation map)) relating the c-axis orientation (i.e. (0001) pole) to the sample coordinate system at 114. This graphical presentation comprises a pole figure map which is the opposite of the inverse pole figure (IPF) map known to those familiar with the art. For instance, c-maps can be generated for each individual dataset (i.e., tile). The images of the c-maps can then be divided into one image or multiple images.

Further, higher-order statistics can be processed at 116. In an illustrative example, macrozones identified at 112 are obtained and metrics on the macrozones are computed, including n-point statistics (e.g. 2-point statistics). The n-point statistics are applied to analyze the material under test. In this regard, the data can be expressed as a continuous function, i.e., a vector having a size the same as the image size. Thus, an m×m pixel image has an $m^2$ dimension space (also referred to herein generally as n-point). By way of illustration, and not by way of limitation, a 200×200 pixel image has 40,000 2-point statistics. By expanding out to a 40,000-dimension space, the image reduces to a single point. By obtaining a plurality of different data sets, each data set having the same dimensions (40,000 in this example), and by plotting each data set as a single point in space, trend analysis can be performed.

The overall texture of the sample is then partitioned into the orientation descriptors that comprise each zone of microtexture at 118. This allows an investigator to compute or derive information on regions of microtexture that they would normally perform on the level of the whole sample.

According to still further aspects of the present disclosure, the obtained data, including the microstructure metrics, n-point information, etc., are stored in a long-term data storage and archival system for subsequent use at 120. The stored information can be retrieved for performing quality control at 122. For instance, microstructure metrics can be retrieved from storage for comparison across different data sets and samples. This allows, as an example, an engineer to make decisions about quality control of thermomechanical processing.

As another example, the data stored in the database at 120 can be evaluated for various data mining operations at 124. More particularly, n-point information is stored, mapped, processed, searched and/or otherwise manipulated to perform analysis of orientation information.

The flow described above is described in greater detail in U.S. Pat. No. 9,070,203 to Salem et al. issued on Jun. 30, 2015, the entirety of which is hereby incorporated by reference.

Embodiments of Orientation Measurement Device

According to aspects of the present disclosure, embodiments of the orientation measurement device 200 is shown in FIG. 2. As shown in FIG. 2, a light source 210 emits light that is received by a linear polarizer 220, which has a polarization axis and produces linearly polarized light from the received light. The linearly polarized light is received by a beam splitter 240, which redirects the linearly polarized light to an objective lens 250. The objective lens 250 focuses the light onto a sample 260 that has an optical anisotropy. The sample 260 reflects light that is affected by the sample's optical anisotropy. The reflected light from the sample 260 is propagated to the beam splitter 240 by the objective lens 250 and further from the beam splitter 240 to the analyzer 270, which has a polarization axis that is generally orthogonal (i.e., orthogonal or nearly orthogonal) to the polarization axis of the polarizer 220. The analyzer 270 receives the light from the beam splitter 240 and produces a partially extinguished light.

The partially extinguished light is a function of the polarization axis of the linear polarizer 220, the polarization axis of the analyzer 270, and the optical anisotropy of the sample 260. In a system without a sample (i.e., in the case of optically isotropic reflection), the partially extinguished light would actually be fully extinguished light, because the polarization axis of the polarizer 220 is orthogonal to the polarization axis of the analyzer 270. However, in a system with a sample under test, the light reflected off the sample 260 will include different characteristics than the light from the linear polarizer 220. Thus, the light through the analyzer will only be partially extinguished instead of fully extinguished. The partially extinguished light is captured by a camera 280.

To obtain enough information in the measurements to determine orientation of the sample, the sample should be rotated a total of one-hundred-and-eighty degrees by smaller increments (i.e., rotation angle increment). By rotating the sample 260 and collecting multiple partially extinguished images, both the azimuth and inclination data can be determined. For example, a measurement may be taken of a sample, then the sample is rotated by a rotation angle increment and another measurement is taken. By rotating the sample 260, the effect of the sample 260 on the polarized light from the linear polarizer 220 is changed and a modulated intensity is captured by the camera 280 at each spatial pixel location. By measuring the sample 260 at several different rotation angles, the measurements of modulated intensity can be interrogated to extract the phase and amplitude of the modulation, which can be used to indicate the azimuth and inclination data of the sample's optic axis. The azimuth and inclination data are then used to quantify MTRs in the sample 260, using a mapping between the azimuth and inclination data to orientation of basal (0001) poles to identify MTRs in the sample. As mentioned above, after a sample is quantified at one tile, the sample (or the orientation measurement device) may be moved to interrogate another tile of the sample.

In another embodiment of the orientation measurement device described herein, instead of rotating the sample 260, the linear polarizer 220 and the analyzer 270 are rotated by the rotation angle increment such that the polarization axis of the polarizer 220 remains orthogonal to the polarization axis of the analyzer 270 as measurement is taken. Thus, the sample remains in place, while the light is polarized along a different axis relative to the sample 260. This method may be desirable in some instances, because when the sample is rotated, the sample may not be directly centered on the axis of rotation of the sample. Thus, when the sample is rotated, a correction algorithm needs to align the sample for the different measurements. However, if the polarizer 220 and the analyzer 270 are rotated instead of the sample, then such a correction algorithm is not required, though the modulation response measured by the camera 280 will require additional calibration to account for the effects of the beam splitter 240 and other optical elements.

In another embodiment of the orientation measurement device described herein, the polarizer 220 is not a linear polarizer. Instead, the polarizer 220 is a circular polarizer 220. For example, the circular polarizer 220 may be a linear polarizer with a quarter-wave plate after the linear polarizer oriented appropriately with respect to the linear polarizer to produce circular polarization. Thus, the analyzer 270 may rotate to different angles at separate rotation angle increments to get a series of measurements of the sample at different rotation angles over time. This embodiment reduces the number of moving parts to only the analyzer and does not require the correction algorithm required when rotating the sample.

Figure 3A:
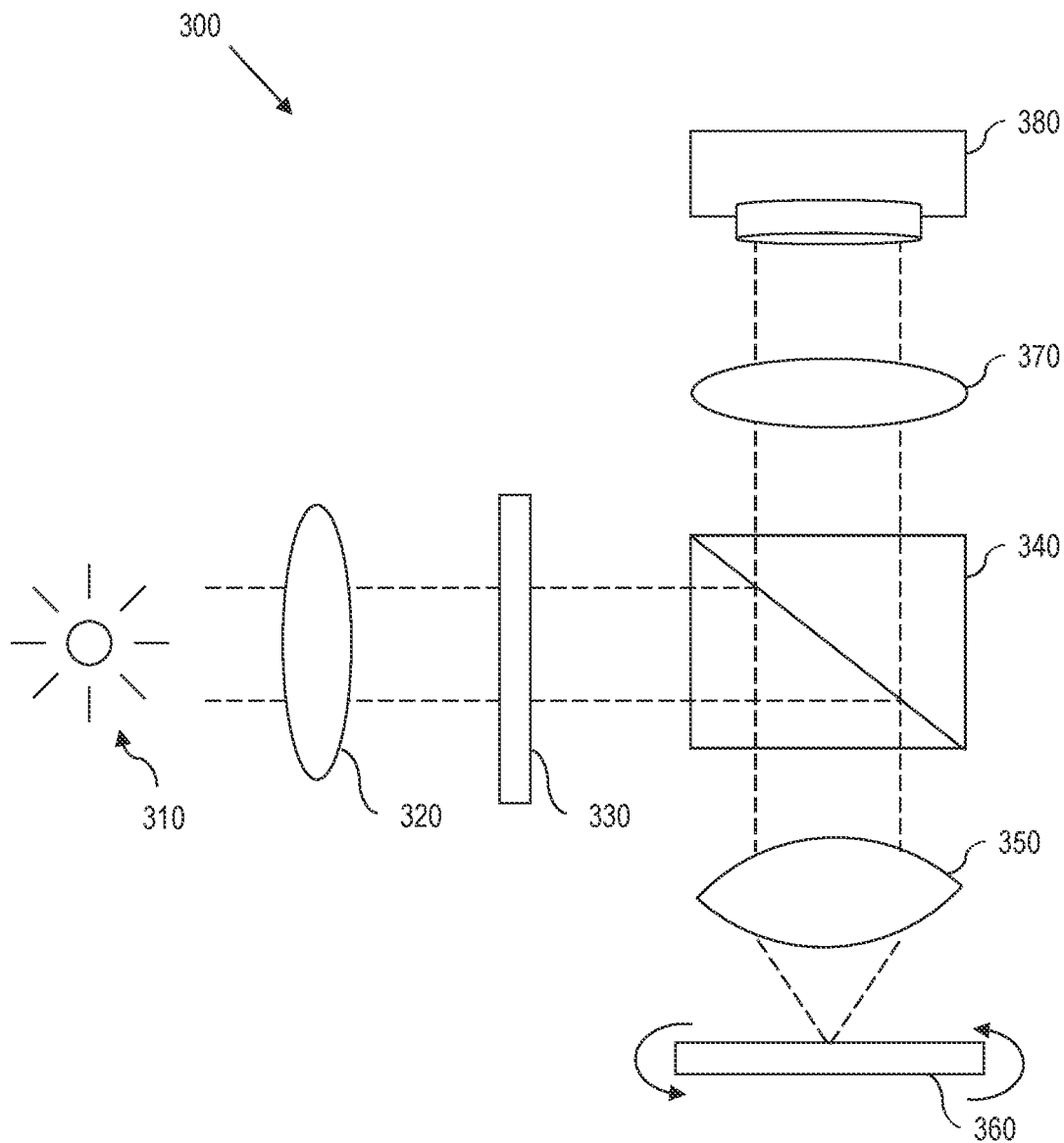
FIG. 3A is a block diagram of a first alternate embodiment of an optical orientation measurement device for use in the System for analyzing MTRs of a sample, according to various aspects of the present disclosure.

Another embodiment of the orientation measurement device described herein is shown in FIG. 3A. Similar to the embodiments described in FIG. 2, the embodiment the orientation measurement device 300 of FIG. 3A comprises a monochromatic light source 310 and a fixed linear polarizer 320. Moreover, after the linear polarizer 320, the embodiment includes an additional polarizing element or group of polarizing elements 330 that include appropriately oriented liquid crystal variable retarders to create an arbitrary polarization state generator, so the light after the second set of polarizing elements 330 is controllably and arbitrarily elliptically polarized. The elliptically polarized light is redirected by a beam splitter 340 to an objective lens 350. The objective lens 350 focuses the light on the sample 360, which then reflects the light. The reflected light propagates back through the objective lens 350 to the beam splitter 340 and continues through an analyzer 370 to a camera 380. In the embodiment of FIG. 3A, the analyzer 370 is a fixed circular polarizer. Thus, the polarizer 320 is fixed, the analyzer 370 is fixed, and the sample 360 is fixed. While the sample is described as fixed, the sample (or the orientation measurement device) may be moved laterally in an X or Y direction to interrogate another tile of the sample, as previously described.

Figure 3B:
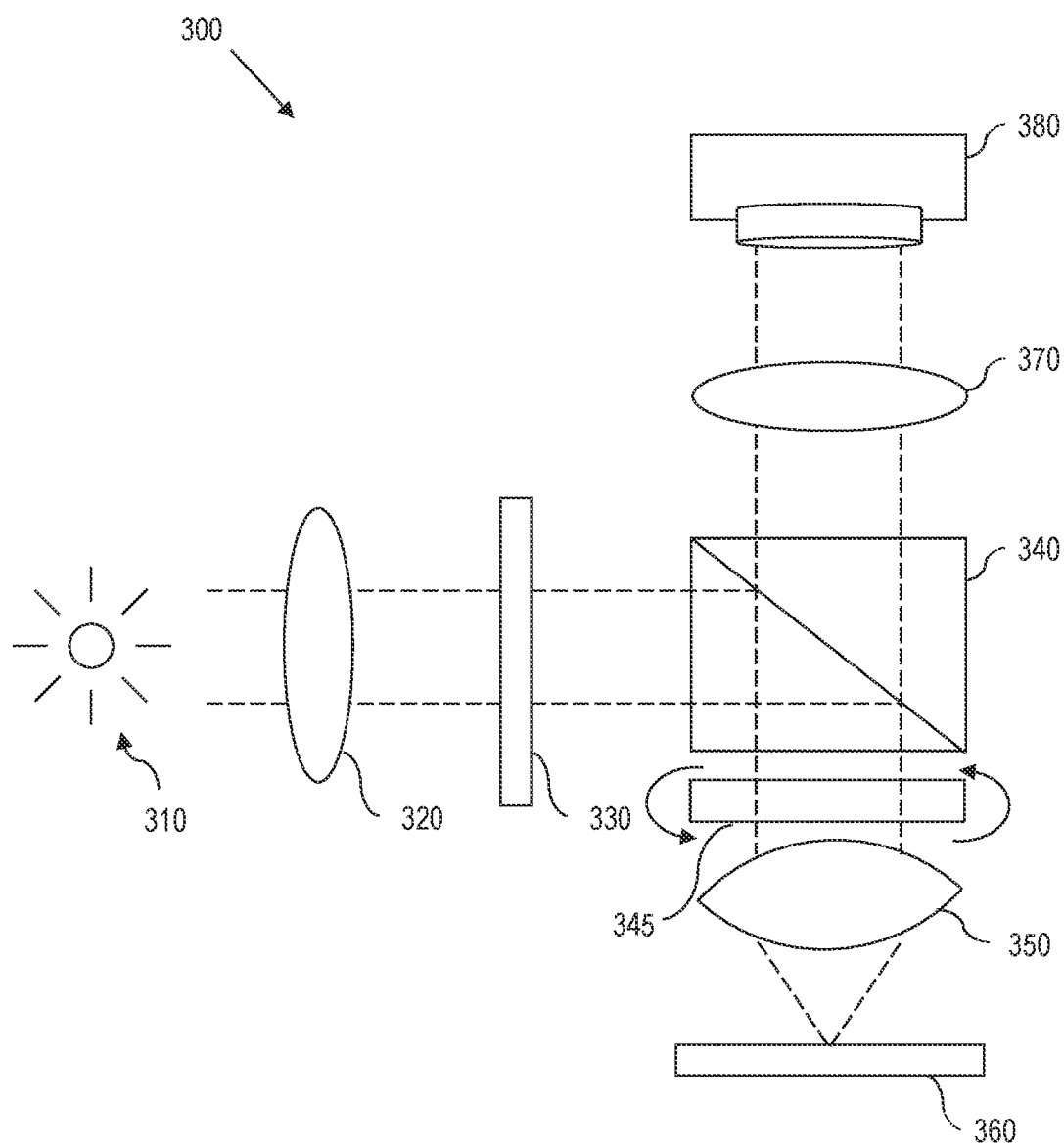
FIG. 3B is a block diagram of a second alternate embodiment of an optical orientation measurement device for use in the System for analyzing MTRs of a sample, according to various aspects of the present disclosure

Another embodiment of the orientation measurement device described herein is shown in FIG. 3B. Similar to the embodiments described in FIGS. 2 and 3A, the embodiment the orientation measurement device 300 of FIG. 3B comprises a monochromatic light source 310 and a fixed linear polarizer 320. Moreover, after the linear polarizer 320, the embodiment includes an additional polarizing element or group of polarizing elements 330 that include appropriately oriented liquid crystal variable retarders to create an arbitrary polarization state generator, so the light after the second set of polarizing elements 330 is controllably and arbitrarily elliptically polarized. The elliptically polarized light is redirected by a beam splitter 340 to an objective lens 350 through an achromatic half-wave plate 345. The achromatic half-wave plate 345 has an effect of rotating a plane of polarization of the light by twice the angle at which the achromatic half-wave plate 345 is relative to the incoming light from the beam-splitter 340. For example, if the light from the beam splitter 340 is plane-polarized "horizontally" and is incident on the achromatic half-wave plate 345 orientated at twenty-two and a half degrees, then the polarization of the light from the achromatic half-wave plate 345 to the objective lens 350 will be plane-polarized at forty-five degrees.

The objective lens 350 focuses the light on the sample 360, which then reflects the light. The reflected light is now elliptically polarized instead of being plane polarized. A degree of ellipticity of the polarized light is a function of the sample crystallographic orientation and, critically, the angle of the plane-polarized light that is incident upon the sample. The reflected light propagates back through the objective lens 350 to the achromatic half-wave plate 345, and due to the reciprocal nature of the half-wave plate 345, the polarization of the light is rotated back to its initial state, but with the sample information encoded in the degree of ellipticity of the polarization (e.g., forty-five degrees using the example above).

The light with the encoded sample information passes to the beam splitter 340 and continues through an analyzer 370 to a camera 380. In the embodiment of FIG. 3B, the analyzer 370 is a fixed polarizer. A servo then rotates the half-wave plate to another angle, and the process is repeated.

With the embodiment of FIG. 3B, the system is able to avoid changing the angle of the polarization relative to the beam splitter 340, which has effects that are sensitive to the angle of the polarized light that is incident upon it.

The achromatic half-wave plate 345 is essential to the embodiment of FIG. 3B, because a non-achromatic half-wave plate is dependent upon a wavelength of light passing through it. Thus, with a non-achromatic half-wave plate, off-nominal wavelengths result in waveplate retardance values that are off-nominal as well (e.g., a half-wave plate designed for 630 nm that is passing 500 nm light through it will not have half-wave retardance). This, in turn, distorts the signal. Because light-emitting diodes (LEDs)—even so-called "monochromatic" LEDs—actually have a fairly broad output spectrum (i.e., they are not truly monochromatic), it is very important to select an achromatic waveplate that is insensitive to the majority of wavelengths in the LED's output spectrum. For example, an achromatic waveplate with a specified insensitivity range of 630-835 nm used with a 730 nm LED source with a FWHM (full width at half maximum) bandwidth of 40 nm can be used, because the LED source is squarely in the middle of the range of the waveplate. The waveplate is also tolerant of off-axis incidence angles, which is important because light incident upon the half-wave plate is not collimated.

The embodiments of FIGS. 2, 3A, and 3B can have alternate embodiments. For example, instead of a fixed circular polarizer and a rotating linear analyzer, the polarizer may be linear and rotatable, and the analyzer may be a fixed circular analyzer. As another example, instead of an elliptical polarizer and a circular analyzer, the polarizer may be a circular polarizer and the analyzer may be an elliptical analyzer. For each alternate embodiment, calibration will be needed to correlate the measured intensity response to the orientation of the optic axis at each sample location.

The camera 280, 380 captures an image formed by the entering beam. To determine azimuth and inclination data of the optic axis (i.e., the crystallographic axis)), multiple images (i.e., an image sequence) are captured comprising various polarization response states through either the sample 260, 360 and/or the polarizer 220, 330 and/or the analyzer 270, 370 being rotated in a controlled fashion resulting in changes of image intensity captured by the camera 280, 380. This rotation can be accomplished via physical rotation or through electronic modulation in the case of liquid crystal devices, as discussed herein. The azimuth and inclination data obtained through analysis of the collected series of images (i.e., an image sequence) are then used to quantify MTRs in the sample 260, 360.

Figure 4:
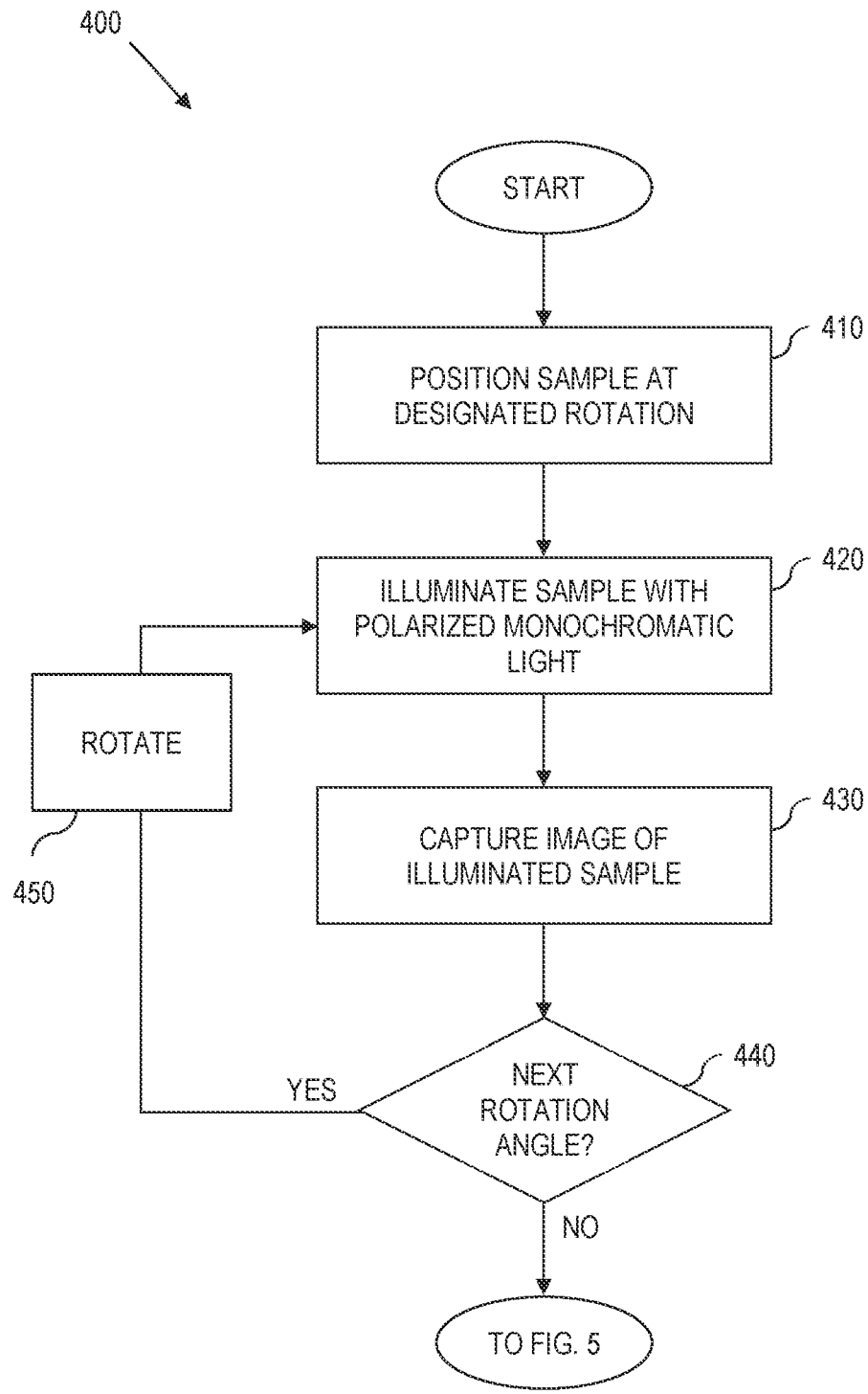
FIG. 4 is a flowchart showing one embodiment of a process for collecting MTR data, according to various aspects of the present disclosure.
Figure 5:
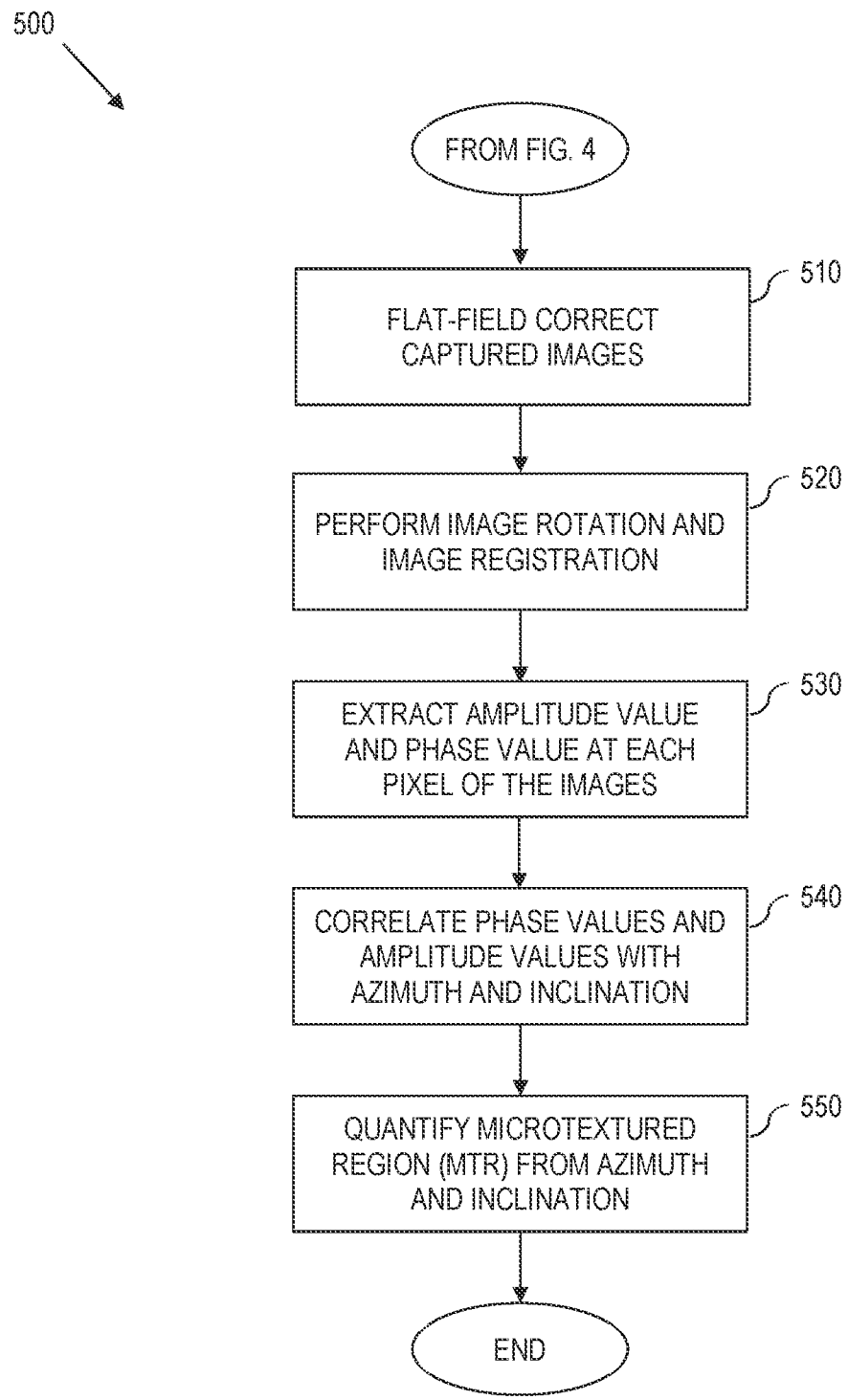
FIG. 5 is a flowchart showing one embodiment of a process for quantifying the collected MTR data, according to various aspects of the present disclosure.

Having provided several embodiments of an orientation measurement device 200, 300, attention is now turned to FIGS. 4 and 5, which are flowcharts showing broad embodiments of processes for collecting MTR data and analyzing MTR data. As shown in FIG. 4, one embodiment of a process 400 comprises positioning a sample at 410. For reference, the sample is positioned at a designated rotational angle (or a reference angle). The positioned sample is illuminated at 420 with a polarized monochromatic light, which results in a reflection of the light by the sample. An image of the sample is then captured at 430. At 440, the process 400 determines whether or not images from all rotational angles, polarization states, or both have been captured (i.e., whether an image sequence (i.e., a series of images) is complete). If there are more rotational angles from which to capture images, then the process 400 performs a rotation (e.g., rotates the sample, rotates the linear polarizer and linear analyzer, rotates the linear analyzer used with a circular polarizer, or performs a discrete data capture in a system with a liquid crystal variable polarizer and a circular analyzer), at 450, and the process 400 continues by illuminating the sample at 420. As one can appreciate, by performing the rotation at given angular intervals, the process 400 acquires information on a sample's anisotropy. When the process 400 determines that images have been captured from all relevant angles, then the process continues to FIG. 5.

FIG. 5 is a flowchart showing one embodiment of a process 500 for analyzing and quantifying the collected MTR data. For some embodiments, a computer system (not shown) is used to control the process 400 of FIG. 4 and, also, to perform the quantification process 500 of FIG. 5. With this in mind, and continuing from the process 400 of FIG. 4, the captured images are flat-field corrected at 510. Thereafter, in some embodiments at 520, the process 500 performs image rotation and/or image registration to align the captured images. From each pixel of the aligned images, properties of intensity modulation at each pixel over the series of images are extracted at 530. The extracted intensity modulation is correlated with azimuth and inclination of the optic axis (i.e., crystallographic axis) at 540 according to a polarization response model for the sample and optical system. From the azimuth and inclination, the process 500 quantifies the MTR at 550.

Generally, the orientation of the optic axis (i.e., amplitude and phase values) can be extracted by using Mueller matrices. For example, designating $S^{OUT}$ as a Stokes vector at each pixel, whose intensity component $S_0$ is captured at each pixel location by camera 280,380 and encodes the orientation information for the sample at each pixel, $S^{OUT}$ can be written as:

$$S^{OUT} = M^{PSA} M^{BS\text{-}TRANS} M^{SAMPLE} M^{BS\text{-}REFL} M^{PSG} S^{IN} \quad [\text{Eq. 1}]$$

with $S^{IN}$ representing an input Stokes vector from the monochromatic light, $M^{PSG}$ representing a Mueller matrix for a polarization state generator (PSG, e.g., polarizer), $M^{BS\text{-}REFL}$ representing a Mueller matrix for the beam splitter when reflecting the input light towards the sample, $M^{SAMPLE}$ representing an orientation-dependent Mueller matrix for the sample, $M^{BS\text{-}TRANS}$ representing a Mueller matrix for polarization effects of a beam splitter under transmission after reflection from the sample, and $M^{PSA}$ representing a Mueller matrix for a polarization state analyzer (PSA, e.g., analyzer). The matrix $M^{SAMPLE}$ can be derived by inversion if the Mueller matrix of the PSG and PSA are well-characterized. Calibration of the beam splitter can be accomplished by measuring a known sample whose Mueller matrix $M^{MEAS}$ is known by other means. Upon deriving $M^{MEAS}$, $M^{SAMPLE}$ can be written as:

$$M^{SAMPLE} = (M^{BS\text{-}TRANS})^{-1} M^{MEAS} (M^{BS\text{-}REFL})^{-1} \quad [\text{Eq. 2}].$$

The optic axis orientation of the sample at each image location can be extracted from the derived $M^{SAMPLE}$. It may not be necessary to have knowledge of every component of the sample Mueller matrix $M^{SAMPLE}$ in order to describe the orientation response of a sample observed according to the various embodiments described herein.

The orientation measurement device may be calibrated using a forward mapping and/or forward model and a known sample. Basically, a sample with a known structure is placed in the orientation measurement device (e.g., any of the embodiments described herein), and the light received by the camera after several rotations is mapped to the known orientation of the sample at a particular pixel location on the sample for a given measurement tile. Thus, a mapping from the light received (i.e., modulation over several images (i.e., image sequence)) to an orientation is created from the calibration. This mapping may be any desired type of mapping. For example, equations may be created such that when the measurements are taken, the equations will produce the orientation of the c-axis (i.e., optic axis) at that tile in the sample. As another example, the calibration can create values for a look-up table (LUT), so the amplitude and/or phase values may be used as inputs to the LUT to get the orientation values for the c-axis. The LUT version takes more storage space but will produce orientation results quicker than the equation version. In some embodiments, a fast Fourier transform (FFT) may be used to evaluate the amplitude and/or phase of the response using a minimum number of images in the image sequence sufficient to sample the finite bandwidth of the response.

In one preferred embodiment and referring back to FIGS. 2-3, the camera 280, 380 is a charged coupled device (CCD) camera. However, as one can appreciate, other image-acquisition devices can be used to capture the light that is reflected from the sample 260, 360.

If imaging of a larger sample is either needed or desired, then some embodiments provide a moving platform (not shown) for the sample 260, 360, thereby permitting the sample 260, 360 to move laterally with reference to the camera 280, 380. Alternatively, to allow different relative positions of the sample 260, 360 with reference to the camera 280, 380, one embodiment comprises a gantry system that permits coordinated movement of the light source 210, 310, the linear polarizer 220, 320, the beam splitter 240, 340, the objective lens 250, 350, the analyzer 270, 370, and the camera 280, 380 with reference to the sample 260, 360. In either case, the system may comprise a controller and a stepper motor or servo motor for controlling the relative positions, rotational angles, or both between the sample 260, 360 and the imaging components 210, 310, 220, 320, 250, 350, 270, 370, 280, 380, etc. Also, those having skill in the art will appreciate that the relative rotation of the sample can range from zero degrees (0°) to 360° (or, in some cases, 180°) in substantially equal angular increments, such as, for example, 5°, 10°, 15°, 20°, 30°, 45°, etc.

As mentioned above, several different configurations may be used to provide the rotations required for the data collection. For example, the polarizer and the analyzer may be rotated synchronously with each other (and possibly along with the beam splitter and the objective lens) using a stepper motor or a servo motor and a controller. As another example, circular polarization through the linear polarizer and quarter-wave retarder may be used with a rotating analyzer. A further example includes a rotating polarizer and a circular analyzer. A fourth example uses a pair of liquid crystal variable retarders to completely eliminate a need for moving parts in the optical train. Liquid crystal retarders work by varying the orientation of anisotropic nematic phase liquid crystals using a variable electrical field. By operating the first liquid crystal variable retarder, for example, at a nominal retardance of one-fourth wavelength, operating the second at a nominal retardance of one-half wavelength, and applying a sequential perturbation to each, a polarization state can be tailored to characterize the sample retardance with a minimum number of images in the image sequence.

Next, for some embodiments, the objective lens 150 focuses light onto a surface of the sample 260, 360 (also designated as critical illumination), while for other embodiments the image of the light source is focused on a back focal plane of the objective lens 260, 360 (also designated as Kohler illumination).

Additionally, although a coaxial system is shown with reference to FIG. 2, it should be appreciated that, in another embodiment, the system comprises a dual-axis illumination system (not shown). Rather than having a single objective lens 250, 350 with a beam splitter 240, 340 (as shown in FIGS. 2-3), a dual-axis illumination system eliminates the beam splitter and employs two objective lenses in the optical pathway.

Also, it should be appreciated that the processes of FIGS. 4 and 5 (e.g., positioning, illuminating, capturing, flat-field correcting, performing image rotation and image registration, extracting modulation (e.g., amplitude and phase values), correlating azimuth and inclination to the phase and amplitude, and quantifying the MTRs) may be implemented in hardware, software, firmware, or a combination thereof. In the preferred embodiment(s), the computer process steps are implemented in software or firmware that is stored in a memory and that is executed by a suitable instruction execution system. If implemented in hardware, as in an alternative embodiment, the computer process steps can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Using the systems and processes described herein, MTR data may be captured over a large area (e.g., 100 millimeters (mm) by 100 mm area) while maintaining a high spatial resolution (e.g., approx. 1-2 microns ($\mu$m)) through a combination of translations of the sample and/or optical system. The size of the scanned area is limited only by the extent of the translation apparatus.

As discussed above, the extraction of MTR data (e.g., crystallographic orientation) is based on amplitude (brightness) change of a series of images (i.e., image sequence) at each corresponding pixel. Thus, the system should be calibrated to compensate for light source brightness, sample reflectance, camera response, etc.

Figure 6:
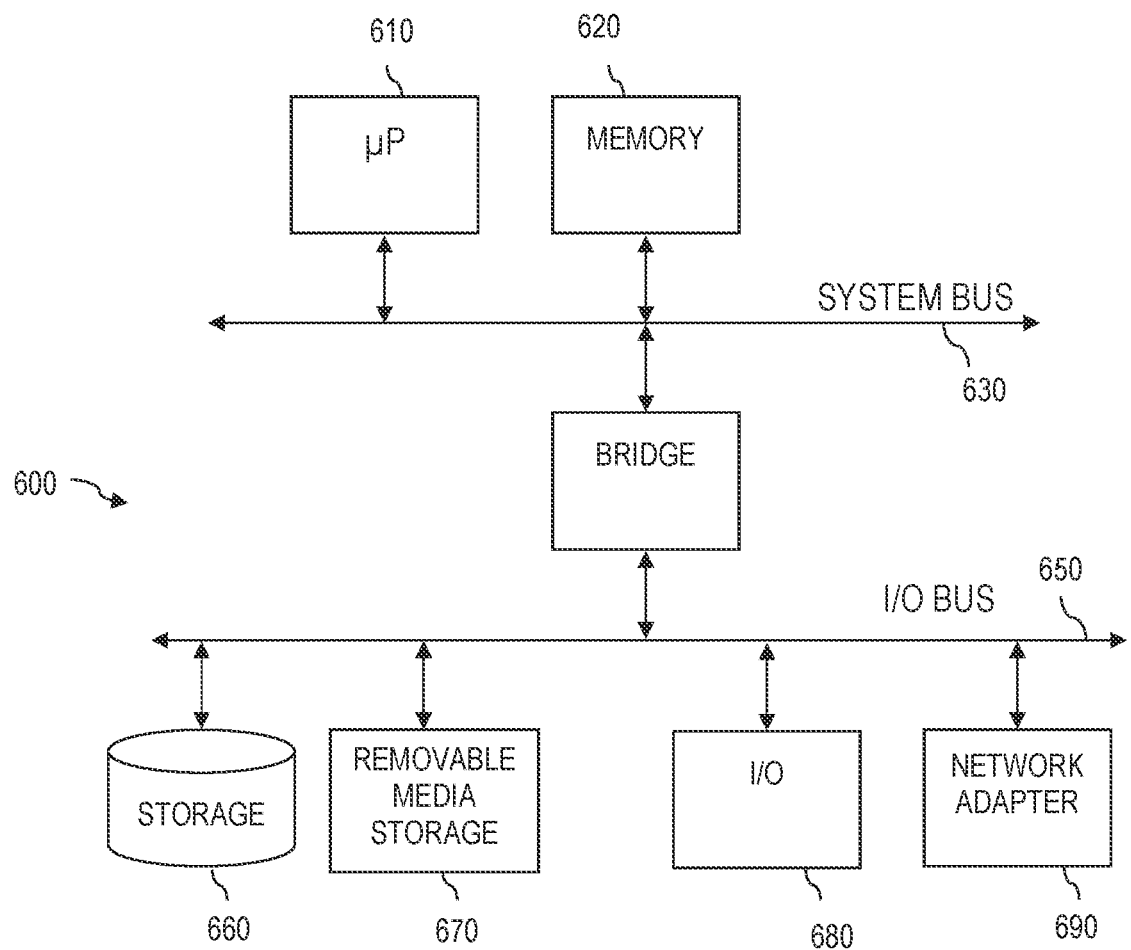
FIG. 6 is a diagram of an exemplary computer processing system for implementing the methods and processes described more fully herein.

Referring to FIG. 6, a schematic of an exemplary computer system having computer readable program code for executing aspects described herein with regard to the preceding FIGURES. The computer system 400 includes one or more microprocessors 410 that are connected to memory 420 via a system bus 430. A bridge 440 connects the system bus 430 to an I/O Bus 450 that links peripheral devices to the microprocessor(s) 410. Peripherals may include storage 460, such as a hard drive, removable media storage 470, e.g., floppy, flash, CD and/or DVD drive, I/O device(s) 480 such as a keyboard, mouse, etc. and a network adapter 490.

The memory 420, storage 460, removable media insertable into the removable media storage 470 or combinations thereof, can be used to implement the methods, configurations, interfaces and other aspects set out and described herein. Thus, the computer system 400 may be used to implement a machine-executable method for capturing features of interests in materials, according to one or more of the methods set out herein. In this regard, the memory 420, storage 460, removable media insertable into the removable media storage 470 or combinations thereof, can implement computer-readable hardware that stores machine-executable program code for capturing features of interests in materials, wherein the program instructs a processor (e.g., microprocessor 410) to perform one or more of the methods set out herein.

Still further, the exemplary computer system may be implemented as an apparatus for capturing features of interests in materials, which may comprise a processor (e.g., microprocessor 410) coupled to a memory (e.g., memory 420, storage 460, removable media insertable into the removable media storage 470 or combinations thereof), wherein the processor is programmed for capturing features of interests in materials by executing program code to perform one or more of the methods set out herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device, e.g., the system described with reference to FIG. 4. A computer readable storage medium, as used herein, is not to be construed as being transitory signals per se, such as radio waves or other freely propagating electromagnetic waves through a transmission media.

Computer readable program instructions described herein can be downloaded to respective computing/processing devices from a computer readable storage medium or to an external computer or external storage device via a network, for example, the Internet, a local area network, a wide area network and/or a wireless network.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Computer program code for carrying out operations for aspects of the present disclosure may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A system comprising:
    a light source for emitting monochromatic light with a bandwidth of up to 40 nanometers;
    a linear polarizer having a first polarization axis, the linear polarizer for receiving the emitted light and producing a polarized light from the received light;
    a beam splitter for receiving the polarized light and redirecting the received light to a half-wave plate;
    an objective lens for receiving the redirected light from the half-wave plate and focusing the redirected light onto a sample, the sample having an optical anisotropy, the objective lens further for receiving a reflected light from the sample and propagating the reflected light to the half-wave plate and the beam splitter, the reflected light being a function of the optical anisotropy;
    an analyzer having a second polarizer with a second polarization axis, the second polarization axis being orthogonal or nearly orthogonal to the first polarization axis, the analyzer for receiving the propagated reflected light from the beam splitter and producing a partially extinguished light,
    an intensity of the partially extinguished light being a function of the first polarization axis, the second polarization axis, and the optical anisotropy of the sample;
    a camera to capture an image sequence of the partially extinguished light; and
    a processing system configured to:
    obtain flat-field corrected images from the captured image sequence;
    performing image rotation and image registration of the flat-field corrected images;
    determining an intensity response at each pixel from the rotated and registered images determining an amplitude value and a phase value at each pixel from the intensity response at each pixel;
    correlating the amplitude value with an inclination of an optic axis at each pixel;
    correlating the phase value with an azimuth of the optic axis at each pixel; and
    and quantifying microstructured regions (MTRs) using the inclination and azimuth at each pixel.

2. The system of claim 1, wherein the light source comprises a light-emitting diode (LED) having a wavelength of 660 nanometers (nm).

3. The system of claim 1, wherein the light source comprises a helium-neon (HeNe) laser having a wavelength of 632 nanometers (nm).

4. The system of claim 1, further comprising a quarter-wave plate located between the linear polarizer and the beam splitter, the quarter-wave plate for receiving the linearly polarized light and producing a circularly polarized light from the linearly polarized light.

5. The system of claim 1, further comprising a servo motor to control rotation of the half-wave plate.

6. The system of claim 1, further comprising a liquid crystal variable retarder located between the linear polarizer and the beam splitter that produces variable elliptical polarization from the linearly polarized light.

7. The system of claim 1, wherein the objective lens focuses light onto a surface of the sample.

8. The system of claim 1, wherein an image of the light source is focused on a back focal plane of the objective lens to produce homogeneous illumination on the sample.

9. The system of claim 1, wherein the light source emits near-infrared (NIR) light.

10. The system of claim 1, where the phase and amplitude are calculated using fast Fourier transform (FFT) analysis.

* * * * *

UNITED STATES PATENT AND TRADEMARK OFFICE
CERTIFICATE OF CORRECTION

PATENT NO. : 12,461,404 B2  
APPLICATION NO. : 18/452881  
DATED : November 4, 2025  
INVENTOR(S) : Daniel P. Satko et al.

Page 1 of 1

It is certified that error appears in the above-identified patent and that said Letters Patent is hereby corrected as shown below:

In the Specification

Column 1, Line 22, "FA8650-17-P-5039" should read --N68335-21-C-0681--.

Signed and Sealed this  
Twentieth Day of January, 2026

John A. Squires  
*Director of the United States Patent and Trademark Office*